3,794,638
THERMOSETTING COMPOSITIONS COMPRISING HIGH VINYL BUTADIENE POLYMER AND A FREE RADICAL INITIATOR
Peter Henry Westermann, Dorking, England, assignor to BP Chemicals Limited, London, England
No Drawing. Filed July 20, 1971, Ser. No. 164,422
Claims priority, application Great Britain, July 27, 1970, 36,294/70
Int. Cl. C08d 5/02
U.S. Cl. 260—94.7 A          3 Claims

ABSTRACT OF THE DISCLOSURE

Thermosetting moulding compositions comprising high vinyl butadiene polymer and, as free radical initiator, 1,3- or 1,4-bis (tertiarybutyl) peroxyisopropyl benzene are described which have improved dimensional stability.

---

The present invention relates to thermosetting moulding compositions based on high vinyl butadiene polymers.

Conventional polymers of 1,3-butadiene, for example those produced by free radical aqueous emulsion processes, contain chains of polymerized butadiene units, each unit being chemically bonded to adjacent units in the chain in either the 1 and 2 positions as shown in (a) or the 1 and 4 positions as shown in (b).

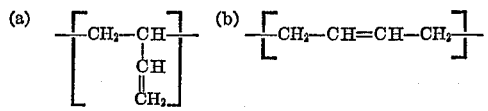

Generally, free radical emulsion polymerization tends to give butadiene polymer containing mainly the 1,4-bonded units and relatively few 1,2-bonded units. Butadiene polymers and copolymers containing more than about 25% of the 1,2-bonded units are known as high vinyl butadiene polymers and can be made, for example, by alkali metal catalyzed polymerization. High vinyl butadiene polymers are known to have useful thermosetting properties.

By a thermosetting moulding composition is meant throughout this specification a composition which can be fabricated into hard infusible shaped articles by the action of heat and pressure, for example by pressing in a heated mould. Examples of such thermosetting moulding compositions are filled or unfilled compositions, reinforced compositions, preimpregnated mats or other forms of reinforcement in preimpregnated form and preformed moulding compositions.

Among the fillers that can be used are inorganic fillers for example various types of carbon blacks, silicas, aluminas and calcium silicate, titanium dioxide, zinc sulphide, calcium carbonate, zinc oxide, magnesia and clays, and organic fillers for example coumarone-indene resins, petroleum resins, high styrene resins such as high styrene-low butadiene copolymers, lignins, wood flour, styrene isobutylene resins and phenolic resins.

Suitable reinforcing materials are for example glass and asbestos fibres, woven or non-woven mats and chopped strands.

A problem encountered in the thermosetting of butadiene polymers even when the polymers contain filler, is that of shrinkage such shrinkage being particularly undesirable in many moulding applications.

An object of the present invention is to provide thermosetting moulding compositions having improved properties. It is a further object of the invention to provide thermosetting moulding compositions having reduced shrinkage on thermosetting.

Accordingly the present invention is a thermosetting moulding composition comprising (a) a high vinyl butadiene polymer and (b) a free radical initiator comprising a bis(alkylperoxy) mononuclear aromatic compound.

The high vinyl butadiene polymer used in the composition of the present invention preferably contains at least 30% of 1,2-bonded units, and most preferably at least 65% of 1,2-bonded units. Particularly useful thermosetting moulding compositions can be made using high vinyl butadiene polymer containing about 85% of 1,2-bonded units. Suitably the viscosity average molecular weight of the polymer is in the range 500 to 500,000 and preferably in the range 1,000 to 200,000, where the viscosity is measured in an Ostwald viscometer using toluene as solvent at 25° C. and the viscosity average molecular weight is calculated from the intrinsic viscosity $[\eta]$ using the equation $[\eta] = 1.69 \times 10^{-4} M_v^{0.73}$.

The bis(alkylperoxy) mononuclear aromatic compound is preferably 1,3- or 1,4-bis (tertiarybutylperoxy isopropyl) benzene.

Mixtures of other free radical initiators can be used together with the bis (alkylperoxy) mononuclear aromatic compound if desired. Preferably the initiator contains at least 50% of the bis alkylperoxy compound.

Suitably the concentration of initiator used in the thermosetting moulding composition is in the range 1 to 10% based on the weight of high vinyl butadiene polymer and is preferably in the range 2 to 7%.

The thermosetting moulding compositions of the present invention can contain a monomer or monomers copolymerizable with the high vinyl butadiene polymer, for example styrene, vinyl toluene, acrylamide, methacrylamide, N,N¹-methylenebisacrylamide, diethyl fumarate, diethyl maleate, dibutyl fumarate, ethylene glycol dimethacrylate, allyl methacrylate and trimethylol propane trimethacrylate. Where such copolymerizable material is incorporated in the composition, the concentration is suitably in the range 5 to 50% based on the weight of high vinyl butadiene polymer.

A thermosetting moulding composition comprising a high vinyl butadiene polymer, a free radical initiator and an acrylamide compound having the general formula $H_2C:CRCONHR'$ wherein R is hydrogen or an organic hydrocarbon substituent and R' is hydrogen or an organic substituent is described in our British patent application No. 36,295/70, filed July 27, 1970 and entitled "Polymer Composition."

The compositions of the present invention have improved properties in respect of dimensional stability and low shrinkage during their thermosetting, however, shrinkage controllers can be added to the compositions if desired.

Examples of shrinkage controllers that can be added to the compositions of the present invention are thermoplastic polymers for example low density ethylene homopolymers or copolymers or mixtures thereof with high density polyethylene; polyvinyl chloride, and polystyrene; saturated liquid aliphatic polyesters for example polypropylene adipate and polypropylene sebacate; polyethylene glycol; and rubbery or liquid isobutene polymers having number average molecular weights in the range 1000 to 100,000. Preferred shrinkage controllers are low density polyethylene or a mixture of low and high density polyethylene. Particularly preferred are isobutene polymers having number average molecular weights in the range 2,000 to 20,000.

A thermosetting moulding composition comprising a polymerizable component comprising a high vinyl butadiene polymer and a free radical initiator and, as a shrink controller, polyethylene comprising an ethylene homopolymer or an ethylene copolymer containing at least 85% of copolymerized ethylene units is described in our British patent application No. 36,296/70 filed July 27, 1970 and entitled "Polymer Composition,"

When it is desired to incorporate polystyrene into the composition of the present invention, preferably monomeric styrene is also incorporated at a concentration in the range 100 to 200% based on the weight of polystyrene.

When it is desired to incorporate a shrinkage controller into the thermosetting moulding compositions of the present invention the concentration of shrinkage controller is suitably in the range 1 to 50% based on the weight of the high vinyl butadiene polymer.

The various components of the thermosetting moulding compositions of the present invention can be mixed together in any desired order, conventional mixing apparatus being used if desired. If desired, a diluent for example hexane or toluene can be used to facilitate the mixing of the components and all, or the bulk of the diluent can then be removed under vacuum or by heating to a temperature below about 100° C. preferably under vacuum or in a stream of nitrogen. Heating the composition to temperatures not greater than about 100° C. can also be used to promote better mixing of the components. When glass fibre is used as reinforcement in the compositions of the present invention it is preferred to use at least some diluent to facilitate the mixing and to minimize mechanical damage to the fibre. Where fillers such as glass fibre, silica, quartz or clay are incorporated in the thermosetting moulding compositions of the present invention, adhesion promoting silanes for example vinyl-tris(beta-methoxy ethoxy) silane can, if desired, be included to improve the adhesion between the filler and the thermoset components in the thermoset products. Antioxidants for example butylated hydroxy toluene (BHT) can be incorporated in the thermosetting moulding compositions of the present invention to prolong their shelf life.

The thermosetting of the thermosetting moulding compositions of the present invention is suitably carried out at temperatures in the range 140 to 250° C. and at pressures in excess of 100 p.s.i.

The thermosetting moulding compositions of the present invention have good mechanical properties in their thermoset state. They are useful for making, for example, articles such as pump impellers and mouldings for electrical applications and mouldings requiring good dimensional stability.

The following examples illustrate the preparation and properties of compositions wherein Examples 1 to 4 are according to the present invention and 5 and 6 are by way of comparison.

The test specimens were moulded at approximately 10 tons/sq. in. and the measured mould shrinkage for each specimen is given in the table.

EXAMPLE 1

A thermosetting moulding composition was prepared by mixing together the following ingredients, the mixture being maintained at 85° C.

|  | P.b.w. |
|---|---|
| High vinyl butadiene polymer with $M_v=23,000$ and containing 86% of 1,2-bonded units | 85 |
| CaCO$_3$ filler | 300 |
| 1,3 bis(tertbutylperoxyisopropyl) benzene | 4 |
| Vinyl-tris (beta-methoxyethoxy) silane | 2 |
| Polyvinyl chloride (sold under the trade name Breon P 130/1) | 15 |
| Acrylamide | 15 |

When a uniform mix had been obtained, ¼" chopped glass fibres (75 p.b.w.) were added and mixed until the fibres were well dispersed.

Test specimens of the resulting thermosetting moulding compositions were moulded at (a) 180° C. and (b) 160° C. for 5 minutes.

EXAMPLE 2

A thermosetting moulding composition was made up as described in Example 1 from the following ingredients:

|  | P.b.w. |
|---|---|
| High vinyl butadiene polymer (as in Example 1) | 85 |
| Calcium carbonate filler | 300 |
| 1,3 bis(tertbutylperoxyisopropyl) benzene | 4 |
| Vinyl-tris (beta-methoxyethoxy) silane | 2 |
| Diethylfumarate | 10 |
| Methacrylamide | 15 |
| ¼" chopped glass fibres | 75 |

Test specimens were moulded at (a) 180° C. and (b) 160° C. for 5 minutes.

EXAMPLE 3

A thermosetting moulding composition was made up as described in Example 1 from the following ingredients:

|  | P.b.w. |
|---|---|
| High vinyl butadiene polymer ($M_v=25,000$ and 1,2 content=76%) | 85 |
| Calcium carbonate filler | 300 |
| 1,3 bis(t-butylperoxyisopropyl) benzene | 4 |
| Diethylfumarate | 10 |
| Acrylamide | 7.5 |
| N,N'-methylenebisacrylamide | 7.5 |
| ¼" chopped glass fibres | 75 |

Test specimens of this composition were moulded at 180° C. for 5 minutes.

EXAMPLE 4

A thermosetting moulding composition was prepared as described in Example 1 from the following ingredients:

|  | P.b.w. |
|---|---|
| High vinyl butadiene polymer (as in Example 1) | 100 |
| Calcium carbonate filler | 300 |
| 1,3 bis(t-butylperoxyisopropyl) benzene | 4 |
| ¼" chopped glass fibres | 75 |

Test specimens of this composition were moulded at 180° C. for 5 minutes.

EXAMPLE 5

A thermosetting moulding composition was made up as described in Example 1 from the following ingredients:

|  | P.b.w. |
|---|---|
| High vinyl butadiene polymer (as in Example 1) | 100 |
| Calcium carbonate filler | 300 |
| Dicumyl peroxide | 4 |
| ¼" chopped glass fibre | 70 |

Test specimens of this composition were moulded at 180° C. for 5 minutes.

EXAMPLE 6

A thermosetting moulding composition was prepared substantially as described in Example 1 using the following ingredients:

|  | P.b.w. |
|---|---|
| High vinyl butadiene polymer $M_v=23,000$ and containing 86% of 1,2-bonded units | 85 |
| CaCO$_3$ filler | 300 |
| Dicumyl peroxide | 4 |
| Butylated hydroxytoluene | 0.5 |
| Acrylamide | 15 |
| ¼" chopped glass fibres | 75 |

Test specimens were moulded at 180° C. for 5 minutes.

TABLE

| Example No.— | Mould shrinkage cm. cm.⁻¹ |
|---|---|
| 1 (a) | 0.0045 |
| 1 (b) | 0.0042 |
| 2 (a) | 0.0046 |
| 2 (b) | 0.0042 |
| 3 | 0.0037 |
| 4 | 0.0032 |
| 5 | 0.0055 |
| 6 | 0.0056 |

I claim:

1. A thermosetting moulding composition comprising (a) a high vinyl butadiene polymer having more than 25% 1,2-bonded units and (b) from 1 to 10% by weight thereof of a free radical initiator comprising at least 50% of 1,3- or 1,4-bis (tertiary butylperoxyisopropyl) benzene.

2. A thermosetting moulding composition according to claim 1 wherein the high vinyl butadiene polymer has at least 65% 1,2-bonded units.

3. A thermosetting moulding composition according to claim 1 wherein the initiator consists of 1,3- or 1,4-bis (tertiary butyl peroxy isopropyl) benzene.

References Cited
UNITED STATES PATENTS

| | | | |
|---|---|---|---|
| 3,635,933 | 1/1972 | Schaffhauser | 260—94.7 A |
| 3,635,934 | 1/1972 | Schaffhauser | 260—94.7 A |
| 3,636,141 | 1/1972 | O'Neill et al. | 260—880 R |
| 3,026,293 | 3/1962 | Caldwell et al. | 260—879 |
| 3,546,323 | 12/1970 | Hwa et al. | 260—879 |
| 3,652,731 | 3/1971 | Coffey et al. | 260—879 |

JAMES A. SEIDLECK, Primary Examiner

W. F. HAMROCK, Assistant Examiner

U.S. Cl. X.R.

260—83.3, 85.1, 94.7 R, 879